June 22, 1965     H. POREPP     3,190,779

METHOD OF FINISHING SLIDE FASTENERS

Filed July 19, 1961

INVENTOR:
HANS POREPP

BY Karl G. Ross
AGENT

United States Patent Office 3,190,779
Patented June 22, 1965

3,190,779
METHOD OF FINISHING SLIDE FASTENERS
Hans Porepp, Essen-Bredeney, Germany, assignor to Opti-Holding A.G., Glarus, Switzerland, a Swiss body corporate
Filed July 19, 1961, Ser. No. 125,195
4 Claims. (Cl. 156—66)

The present invention concerns a method of finishing the ends of slide fasteners.

The invention particularly relates to the finishing of the two terminal ends of individual slide-fastener chains, each slide fastener comprising two meshed coupling members formed of thermoplastic material; its principal object is the provision of certain improvements in the method disclosed and claimed in my U.S. Patent No. 3,001,904, issued September 26, 1961, according to which the finishing step is performed by applying thermoplastic strips transversely of the chains at longitudinally spaced locations while the individual chains are serially connected together in the form of a continuous strip. This application is a continuation-in-part of my application Ser. No. 786,567, filed January 13, 1959, which matured into the aforementioned patent.

Another object of the invention is to mold slider stop elements into the transverse strips applied across the chains.

Briefly, this invention provides a method of finishing slide fasteners by forming end members, which may include stop elements, on meshed slide-fastener chains of extended length, the end members being applied at spaced locations along the chains, whereupon the chains may be cut to produce slide-fastener members of predetermined length having prefinished ends.

The invention will be better understood from the following description taken together with the drawing, wherein.

Figure 4:
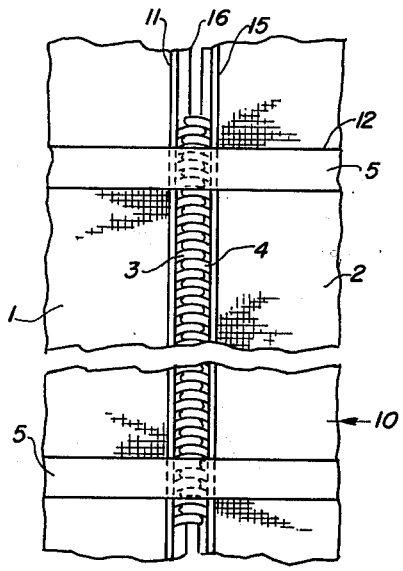
FIG. 4 is a plan view of portions of a slide-fastener chain at one step in the method of the invention.

In FIG. 4 there is shown a slide-fastener chain assembly 10 including a first elongated flat stringer tape 1 having a bead 11. Secured to this bead 11 is a first coupling member 3 which may be a helical thermoplastic filament. The member 3 is meshed with a coupling member 4 which may be another helical thermoplastic filament. The turns of the coupling members may have flattened or projecting portions engaging each other. Coupling member 4 is secured to bead 15 of another flat stringer tape 2 coplanar with tape 1 and parallel thereto. The chain assembly has an extended length much greater than that of a slide-fastener member to be produced therefrom.

Figure 1:
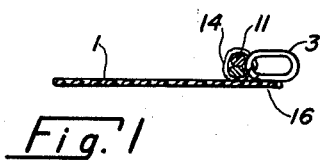
FIGS. 1, 2 and 3 are sectional views taken across different types of fastener chains to which the invention is applicable.

FIG. 1 is a cross-sectional view taken through the tape 1 and showing a turn of the coupling member 3 secured by a thread 14 to the bead 11. The helical member 3 overlies a marginal strip 16 of tape 1. To the extent described, the structure shown in FIGS. 1 and 4 is conventional.

Figure 5:
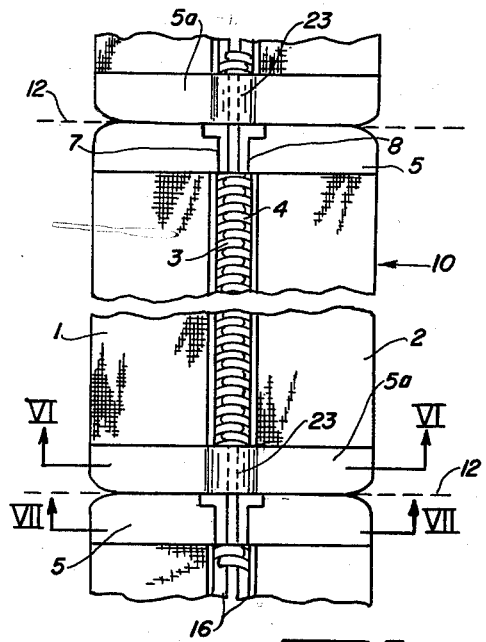
FIG. 5 is a plan view of portions of a slide-fastener chain at another step in the method of the invention.
Figure 7:
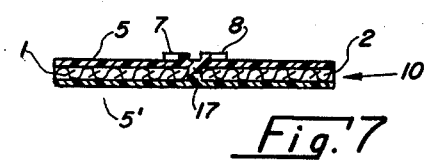

According to the method or process embodying the invention thermoplastic strips 5 are applied to one side of the chain assembly 10 or strips 5, 5' are applied to opposite sides at locations spaced apart a predetermined distance according to the length of the desired slide-fastener structure to be obtained from the assembly 10 (see FIGS. 4, 5 and 7).

Figure 6:
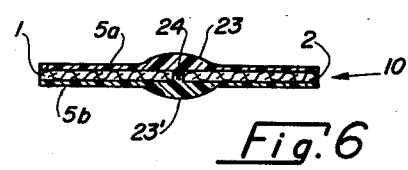
FIGS. 6 and 7 are cross-sectional views respectively taken along lines VI—VI and VII—VII of FIG. 5.

Simultaneously with the application of each strip 5 or strips 5 and 5' there may be applied a contiguous thermoplastic transverse strip 5a, as shown in FIGS. 5 and 6, or a pair of such strips 5a, 5b (see FIG. 6). The strips 5a may be applied to one side of the assembly or strips 5a, 5b may be applied to opposite sides. A heated die may be applied to the strips 5, 5' and 5a, 5b to mold them to desired shapes. In this process, as will be seen from FIGS. 6 and 7, the coupling members 3, 4 lose their identity at the locations of the strips and fuse with them into a thermoplastic mass to be shaped by the die. A mound 23 is formed on each strip 5a over the joint to reinforce the same. Bridge 24 will fuse and join opposing strips 5a, 5b. Two embossed elements 7, 8 may be formed on each strip 5 in alignment with the respective marginal portions of the tapes 1, 2. These elements will serve as so-called top stops to prevent the detachment of a slider which is subsequently applied to the slide-fastener assembly. Mounds 23, 23' on strips 5a, 5b will serve a similar function by forming a so-called bottom stop. If a lower strip 5' is disposed under each strip 5 as indicated in FIG. 7, then this lower strip will bond to upper strip 5 via a connecting bridge 17 under the heat and pressure applied by the molding die.

After the strips 5, 5' 5a and 5b are applied and molded they will be bonded to the textile or plastic tapes 1, 2 and will also be bonded to the thermoplastic coupling members 3, 4 extending beyond the point of fusion. Thereafter, a conventional type of slider (not shown) having two separate elements may be applied to opposite sides of engaged coupling members for opening and closing the assembly. The separate elements of the slider may thereafter be suitably attached together.

The assembly may be cut apart along lines 12 between strips 5, 5a to provide slide fasteners of predetermined length. If desired, the die which molds the strips 5, 5a (or the strip pairs 5, 5' and 5a, 5b) may be also provided with a cutting element to sever the assembly while molding the portions 7, 8 and 23.

The method described makes it possible to apply finishing ends to slide fasteners while the slide fasteners are still part of a slide-fastener structure of extended length. Heretofore, such slide-fastener structures were formed continuously by machine. Then the continuous fastener structures were cut apart into predetermined lengths. Thereafter, each length had to be handled separately for application of finishing members at the ends. The present invention avoids this rehandling, effects a saving of time and material and lowers the cost of manufacture.

Figure 2:
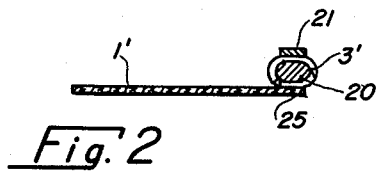
Figure 3:
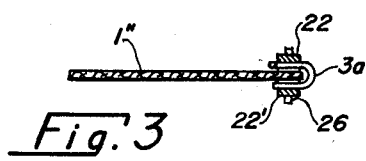

FIGS. 2 and 3 show other types of fastener chains to which the invention may be applied. In FIG. 2, tape 1' has a core 20 extending through a helical thermoplastic coupling member 3' similar to member 3. A cover strip 21 overlies a central portion of the coupling member and core and is sewn thereto by thread 25. In FIG. 3, the tape 1" has a sinuous thermoplastic filament 3a bent longitudinally to form U-shaped loops extending around the free edge of the tape. Cover strips 22 and 22' are applied over loops of the filament abutting opposite sides of the tape. The strips 22, 22' and loops of the member 3a are sewn to the tape 1" by thread 26. The loops of members 3, 3' and 3a may all be formed in conventional manner with projections or lugs to engage corresponding projections and lugs of coupling members to mesh therewith. Regardless of the type of fastener chain employed, the finishing method will be the same as described.

While I have disclosed what I believe to be the best embodiment of my invention, it will be apparent to those skilled in the art that various modifications may be made therein without departing from the spirit and scope of the invention as defined in the appended claims.

What is claimed is:

1. A method of finishing a slide-fastener structure including two slide-fastener chains of meshed thermoplastic coupling members carried on two parallel coplanar stringer tapes, comprising the steps of applying transverse strips of thermoplastic material across said tapes and meshed coupling members at predetermined longitudinally spaced-apart locations, fusing said strips and coupling members at said locations into a moldable mass, shaping said moldable mass at each of said locations into a raised central bottom stop bridging said tapes and coupling members and two transversely separated top stops longitudinally adjoining said bottom stop and extending along the confronting tape edges, and cutting said structure into sections at said locations between said top and bottom stops, each of said sections consisting of two halves interconnected by its bottom stop.

2. A method of finishing a slide-fastener structure including two slide-fastener chains of meshed thermoplastic coupling members carried on two parallel coplanar stringer tapes, comprising the steps of applying a first and a second transverse strip of thermoplastic material next to each other across said tapes and meshed coupling members at each of a plurality of predetermined longitudinally spaced-apart locations, fusing said strips and coupling members at said locations into a moldable mass, shaping said moldable mass at each of said locations into a raised central bottom stop bridging said tapes and coupling members in the region of said first strip and two transversely separated top stops extending along the confronting tape edges in the region of said second strip, and cutting said structure into sections at said locations between said top and bottom stops, each of said sections consisting of two halves interconnected by its bottom stop.

3. A method of finishing a slide-fastener structure including two slide-fastener chains of meshed thermoplastic coupling members carried on two parallel coplanar stringer tapes, comprising the steps of applying pairs of coextensive transverse strips of thermoplastic material across opposite sides of said tapes and meshed coupling members at predetermined longitudinally spaced-apart locations, fusing said pairs of strips and coupling members at said location into a moldable mass, shaping said moldable mass at each of said locations into a raised central top stop bridging said tapes and coupling members and two transversely separated bottom stops longitudinally adjoining said bottom stop and extending along the confronting tape edges, and cutting said structure into sections at said locations between said top and bottom stops, each of said sections consisting of two halves interconnected by its bottom stop.

4. A method of finishing a slide-fastener structure including two slide-fastener chains of meshed thermoplastic coupling members carried on two parallel coplanar stringer tapes, comprising the steps of applying a first and a second pair of coextensive transverse strips of thermoplastic material next to each other across opposite sides of said tapes and meshed coupling members at each of a plurality of predetermined longitudinally spaced-apart locations, fusing said pairs of strips and coupling members at said locations into a moldable mass, shaping said moldable mass at each of said locations into a raised central bottom stop bridging said tapes and coupling members in the region of said first pair of strips and two transversely separated top stops extending along the confronting tape edges in the region of said second pair of strips, and cutting said structure into sections at said locations between said top and bottom stops, each of said sections consisting of two halves interconnected by its bottom stop.

References Cited by the Examiner
UNITED STATES PATENTS
3,001,904   9/61   Porepp _____ 156—66

EARL M. BERGERT, *Primary Examiner.*